United States Patent
Lacy et al.

(10) Patent No.: US 9,394,796 B2
(45) Date of Patent: Jul. 19, 2016

(54) TURBINE COMPONENT AND METHODS OF ASSEMBLING THE SAME

(71) Applicant: General Electric Company, Schenectady, NY (US)

(72) Inventors: Benjamin Paul Lacy, Greer, SC (US); Brian Gene Brzek, Clifton Park, NY (US); Srikanth Chandrudu Kottilingam, Simpsonville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 13/940,806

(22) Filed: Jul. 12, 2013

(65) Prior Publication Data

US 2015/0017018 A1    Jan. 15, 2015

(51) Int. Cl.
*F01D 5/18* (2006.01)
*B23P 15/04* (2006.01)
*F01D 25/14* (2006.01)
*F01D 5/28* (2006.01)

(52) U.S. Cl.
CPC .............. *F01D 5/186* (2013.01); *B23P 15/04* (2013.01); *F01D 5/288* (2013.01); *F01D 25/145* (2013.01); *B23P 2700/06* (2013.01); *F05D 2260/202* (2013.01); *Y10T 29/49337* (2015.01)

(58) Field of Classification Search
CPC ....... F01D 5/186; F01D 5/288; F01D 25/145; F01D 5/005; B23P 15/04; B23P 2700/06; F05D 2260/202; Y10T 29/49337
USPC ...................................................... 416/97 R
See application file for complete search history.

(56) References Cited

U.S. PATENT DOCUMENTS

| | | |
|---|---|---|
| 4,664,597 A | 5/1987 | Auxier et al. |
| 4,672,727 A | 6/1987 | Field |
| 4,676,719 A | 6/1987 | Auxier et al. |
| 5,216,808 A | 6/1993 | Martus et al. |
| 5,957,657 A | 9/1999 | Akita et al. |
| 6,004,620 A | 12/1999 | Camm |
| 6,243,948 B1 | 6/2001 | Lee et al. |
| 6,265,022 B1 | 7/2001 | Fernihough et al. |
| 6,329,015 B1 | 12/2001 | Fehrenbach et al. |
| 7,363,707 B2 | 4/2008 | Powers |
| 7,653,994 B2 | 2/2010 | Dasilva et al. |
| 7,900,458 B2 | 3/2011 | James et al. |
| 2007/0205189 A1 | 9/2007 | Grossklaus, Jr. et al. |
| 2009/0255117 A1 | 10/2009 | Hovel et al. |
| 2011/0293423 A1 | 12/2011 | Bunker et al. |
| 2012/0087803 A1 | 4/2012 | Butler et al. |
| 2012/0167389 A1* | 7/2012 | Lacy .............. B23P 6/002 29/889.1 |
| 2013/0045106 A1 | 2/2013 | Lacy |

* cited by examiner

*Primary Examiner* — Igor Kershteyn
*Assistant Examiner* — Aaron R Eastman
(74) *Attorney, Agent, or Firm* — Armstrong Teasdale LLP (57) ABSTRACT

A turbine component is provided. The turbine component includes an airfoil having a first surface and a second surface. A thermal barrier coating is coupled to the second surface, wherein the thermal barrier coating includes a first portion, a second portion and a trench defined between the first and second portions. A channel is coupled in flow communication to the first surface and the trench, wherein the channel includes a first sidewall and a second sidewall opposite of the first sidewall. The first and second sidewalls extend from the first surface and toward the trench at an angle. The turbine component includes a cover coupled to the second surface, wherein the cover includes a first end coupled to the first portion and a second end extending into the trench and spaced from the second portion.

19 Claims, 10 Drawing Sheets

TURBINE COMPONENT AND METHODS OF ASSEMBLING THE SAME

BACKGROUND OF THE INVENTION

The embodiments described herein relate generally to turbine components, and more particularly, to methods and systems for coupling a cover to the turbine component to facilitate medium flow along the turbine component.

In a gas turbine, hot gases flow along an annular hot gas path. Typically, turbine stages are disposed along the hot gas path such that the hot gases flow through buckets and nozzles of the turbine stages. The turbine buckets may be secured to a plurality of turbine wheels, with each turbine wheel being mounted to a rotor shaft for rotation therewith.

Conventionally, turbine buckets may include an airfoil extending radially outwardly from a substantially planar platform. A hollow shank portion extends radially inwardly from the planar platform and may include a dovetail or other means to secure the bucket to the turbine wheel. In general, during operation of the gas turbine, the hot gases are generally directed over and around the airfoil. To protect the airfoil from high temperatures, the airfoil may include an airfoil cooling circuit configured to supply a cooling medium, such as air, throughout the airfoil. The cooling circuit may reduce the temperature differential between the pressure and suction sides of the airfoil. In addition, the exterior surfaces of the airfoil may be coated with a thermal barrier coating to provide oxidation/corrosion and/or thermal protection. Theses coatings may be used in conjunction with a cooling scheme or arrangement for supplying air to the pressure side surface and/or the suction side surface of the airfoil.

The cooling circuit may use a series of film holes and/or channels defined through the airfoil. More particularly, the film holes are typically drilled through the airfoil surface typically at an angle and into the airfoil cooling circuit to allow the cooling medium flowing through the cooling circuit to be supplied to the airfoil surface. However, some film holes such as round holes, may provide for less than optimal cooling of the airfoil's surface. To improve cooling effectiveness, some airfoils may include advanced-shaped film holes (e.g., diffuser, chevron-shaped holes) or other complex-shaped outlets for the film holes. However, these advanced-shaped holes may be difficult to manufacture and, thus, significantly increase the overall costs of producing a turbine bucket. Moreover, some airfoils may include diffusers positioned on an outer surface of the airfoil and in flow communication with the film holes. Surface diffusers, however, can be difficult to manufacture, repair and/or replace.

BRIEF DESCRIPTION OF THE INVENTION

In one aspect, a turbine component is provided. The turbine component includes an airfoil having a first surface and a second surface. A thermal barrier coating is coupled to the second surface, wherein the thermal barrier coating includes a first portion, a second portion and a trench defined between the first and second portions. A channel is coupled in flow communication to the first surface and the trench, wherein the channel includes a first sidewall and a second sidewall opposite of the first sidewall. The first and second sidewalls extend from the first surface and toward the trench at an angle. The turbine component includes a cover coupled to the second surface, wherein the cover includes a first end coupled to the first portion and a second end extending into the trench and spaced from the second portion.

In another aspect, a cover is provided. The cover is coupled to an airfoil and positioned within a trench to direct medium flow from an angled channel and along the airfoil. The cover includes a first end coupled to the airfoil and a second end coupled to the first end and configured to extend into the trench. The second end includes an angled surface that is aligned with the angled channel. A brazed fastener is coupled to the first and second ends and to the airfoil.

In yet another aspect, a method of assembling a turbine component is provided. The method includes forming an angled channel through a first surface and a second surface of a substrate. A cover is formed having a first end and a second end. The method includes coupling the cover to the first surface and extending the cover beyond the angled channel. The second end is aligned with the angled channel. Moreover, the method includes applying a mask to the first surface and the cover to cover the angled channel. A thermal barrier coating is applied to the first surface. The method includes forming a trench through the thermal barrier coating and in flow communication with the angled channel.

DETAILED DESCRIPTION OF THE INVENTION

The embodiments described herein relate generally to turbine components. More particularly, the embodiments relate to methods and systems for coupling a cover to the component to facilitate fluid flow along the component. It should be understood that the embodiments described herein for heated components are not limited to turbine airfoils, and further understood that the description and figures that utilize a turbine, an airfoil and a cover are exemplary only. Moreover, while the embodiments illustrate the turbine airfoil, the embodiments described herein may be included in other suitable turbine components such as, but not limited to, turbine nozzles, stator vanes, compressor blades, combustion liners, transition pieces and exhaust nozzles. Additionally, it should be understood that the embodiments described herein need not be limited to turbine components. Specifically, the cover may generally be used in any suitable article through which a medium (e.g., water, steam, air, fuel and/or any other suitable fluid) is directed for cooling a surface of the article and/or for maintaining the temperature of a surface of the article. In the exemplary embodiment, three perpendicular axes X, Y and Z and associated X, Y and Z planes of reference are used to define a three-dimensional Cartesian coordinate system relative to turbine component.

Figure 1:
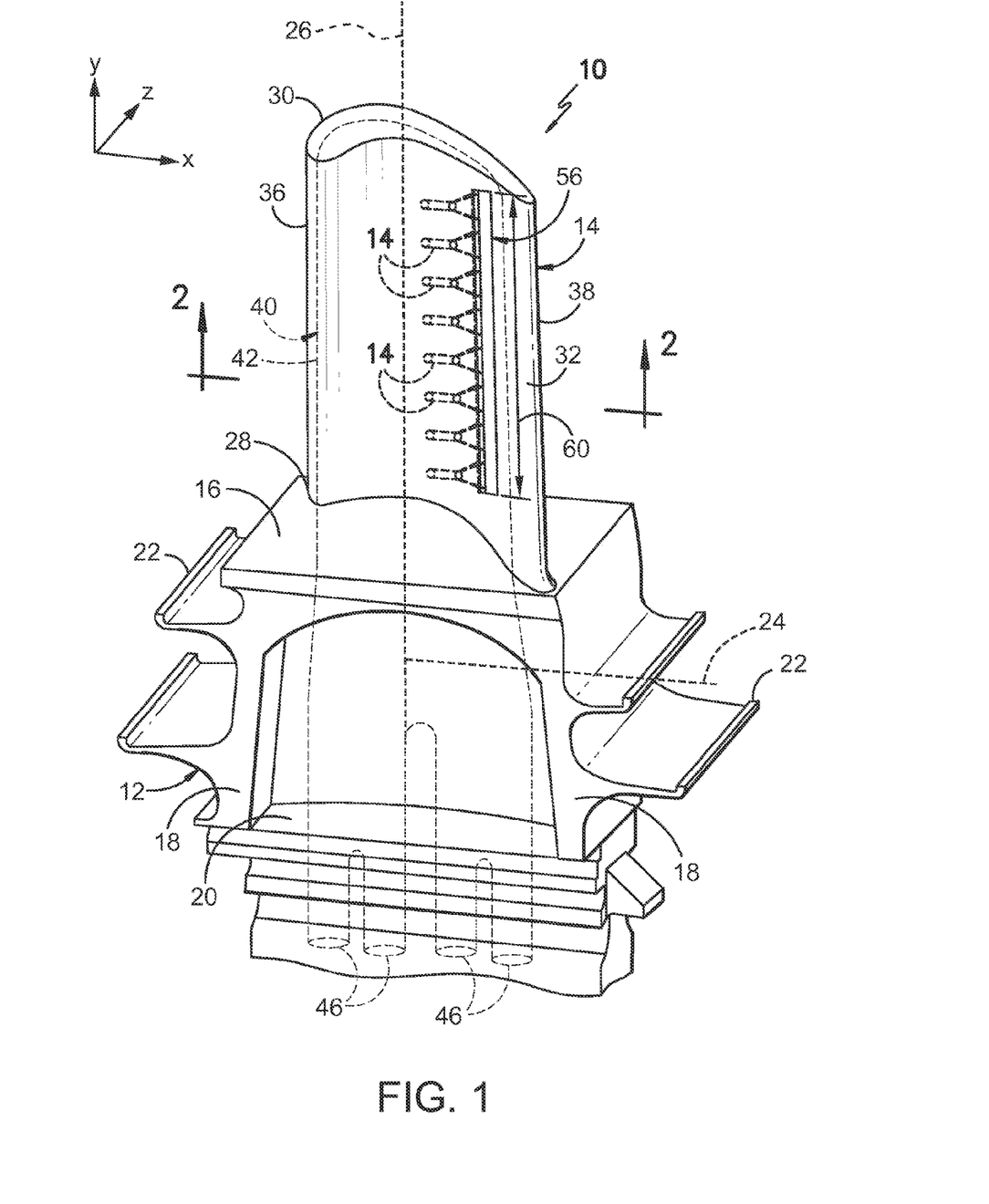
FIG. 1 is a perspective view of an exemplary turbine component.
Figure 2:
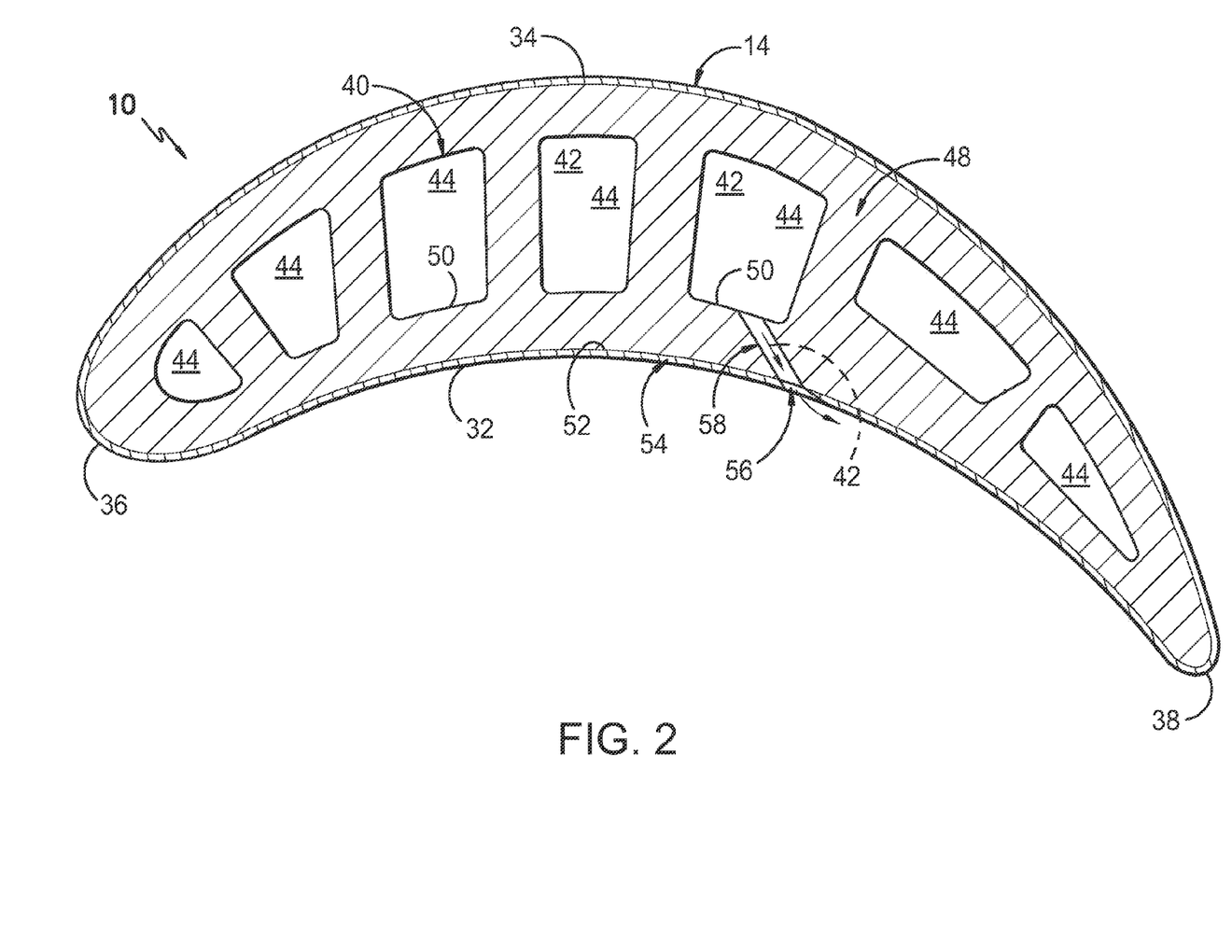
FIG. 2 is a cross-sectional view of the turbine component shown in FIG. 1 and taken along line 2-2.

FIG. 1 is a perspective view of a turbine component 10. FIG. 2 is a cross-sectional view of turbine component 10 (shown in FIG. 1) taken along line 2-2. Turbine component 10 includes a shank portion 12 and an airfoil 14 extending from a substantially planar platform 16. Platform 16 forms a radially inward boundary for hot gases of combustion flowing through a turbine section of a gas turbine (not shown). Shank portion 12 is configured to extend radially inwardly from platform 16 and includes sides 18, a hollow cavity 20 partially defined by sides 18 and one or more angel wings 22 extending in an axial axis 24 from each side 22. Shank portion 12 also includes a root structure (not illustrated), such as a dovetail, configured to secure turbine component 10 to a rotor disk (not shown) of a gas turbine (not shown).

In the exemplary embodiment, airfoil 14 extends outwardly along a radial axis 26 from platform 16 and includes an airfoil base 28 disposed at platform 16 and an airfoil tip 30 disposed opposite airfoil base 28. Airfoil 14 includes a pressure side surface 32 and a suction side surface 34 extending between a leading edge 36 and a trailing edge 38. Pressure side surface 32 includes an aerodynamic, concave outer surface of airfoil 14. Similarly, suction side 34 defines an aerodynamic, convex outer surface of airfoil 14.

In the exemplary embodiment, turbine component 10 includes an airfoil cooling circuit 40 extending radially outwardly from shank portion 12 for flowing a medium 42, such as a cooling fluid (e.g., air, water, fuel, steam or any or suitable fluid), throughout airfoil 14. In the exemplary embodiment, airfoil circuit 40 includes a plurality of channels 44 extending radially outwardly from one or more supply passages 46 to an area of airfoil 14 generally adjacent airfoil tip 30. More particularly, airfoil circuit 40 includes seven radially extending channels 44 configured to flow medium 42 supplied from supply passages 46 throughout airfoil 14. Alternatively, airfoil circuit 40 may include any number of channels 44 to enable airfoil 14 to function as described herein.

Airfoil 14 is formed from a substrate 48 having a first or inner surface 50 and a second or outer surface 52, wherein outer surface 52 is generally exposed to relatively higher temperatures than inner surface 50 during operation of a gas turbine (not shown). Inner surface 50 of substrate 48 may generally define all or part of channels 44 of airfoil circuit 40, wherein medium 42 flowing through channels 44 provides direct cooling for such surface 52. In the exemplary embodiment, substrate 48 includes any suitable material capable of withstanding desired operating conditions of component 10. More particularly, substrate 48 includes suitable materials such as, but is not limited to, ceramics and metallic materials, such as steel, refractory metals, nickel-based superalloys, cobalt-based superalloys, iron-based superalloys and/or the like. Additionally, to protect outer surface 52 from corrosion/oxidation and/or to increase the operating temperature capability of substrate 48, a thermal barrier coating (TBC) 54 is coupled to and along outer surface 52 of substrate 48.

Turbine component 10 includes an angled trench 56 and a plurality of holes and/or angled channels 58 (e.g., diffuser holes/channels) defined in airfoil 14 and in flow communication with trench 56. In the exemplary embodiment, diffuser channels 58 are configured to supply a portion of medium 42 flowing through airfoil circuit 40 to angled trench 56 for cooling pressure side surface 32 and/or suction side surface 34 of airfoil 14. More particularly, each of diffuser channels 58 is in flow communication with a portion of airfoil circuit 40 at one end and is in flow communication with angled trench 56 at another end. Diffuser channels 58 extend within airfoil 14 from inner surface 50 of substrate 48 (e.g., from one of channels 44 of airfoil circuit 40) to angled trench 56 defined in pressure side surface 32 of airfoil 14. As such, medium 42 flowing through airfoil circuit 40 is directed into angled trench 56 through each of diffuser channels 58 and is subsequently expelled from angled trench 56 onto pressure side surface 32 of airfoil 14 to facilitate film cooling of such surface 32.

Angled trench 56 is defined in airfoil 14 so as to define any suitable radial length 60 that allows each of diffuser channels 58 to be in flow communication with trench 56. More particularly, diffuser channels 58 are spaced apart radially along airfoil 14 in a row extending generally from airfoil base 28 to airfoil tip 30. Alternatively, angled trench 56 may be configured to extend radially only partially between airfoil base 28 to airfoil tip 30. Angled trench 56 and/or diffuser channels 58 can be defined at any suitable location within and/or around outer perimeter of airfoil 14. For example, angled trench 56 may be defined on pressure side 32 or suction side 34 of airfoil 14 at any suitable location between leading and trailing edges 36 and 38, with diffuser channels 58 being defined in airfoil 14 at a suitable location for directing medium 42 flowing through airfoil circuit 40 into angled trench 56. Moreover, turbine component 10 may include more than one angled trench 56 and corresponding set of diffuser channels 58. Multiple trenches 56 may be defined on pressure side 32 or suction side 34 of airfoil 14. Alternatively, one or more trenches 12 may be defined on both pressure and suction sides 32 and 34 of airfoil 14.

Figure 3:
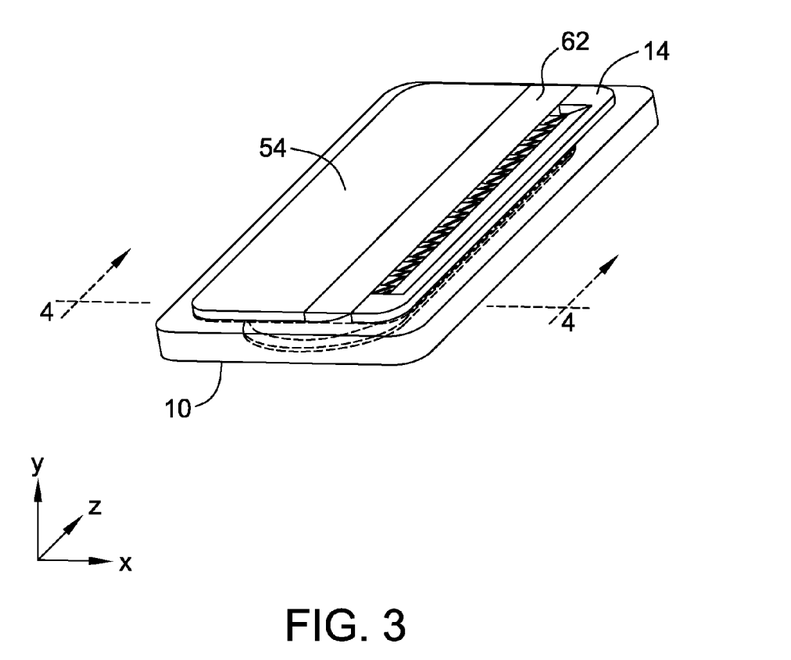
FIG. 3 is a perspective view of an exemplary cover coupled to the turbine component shown in FIG. 1.
Figure 4:
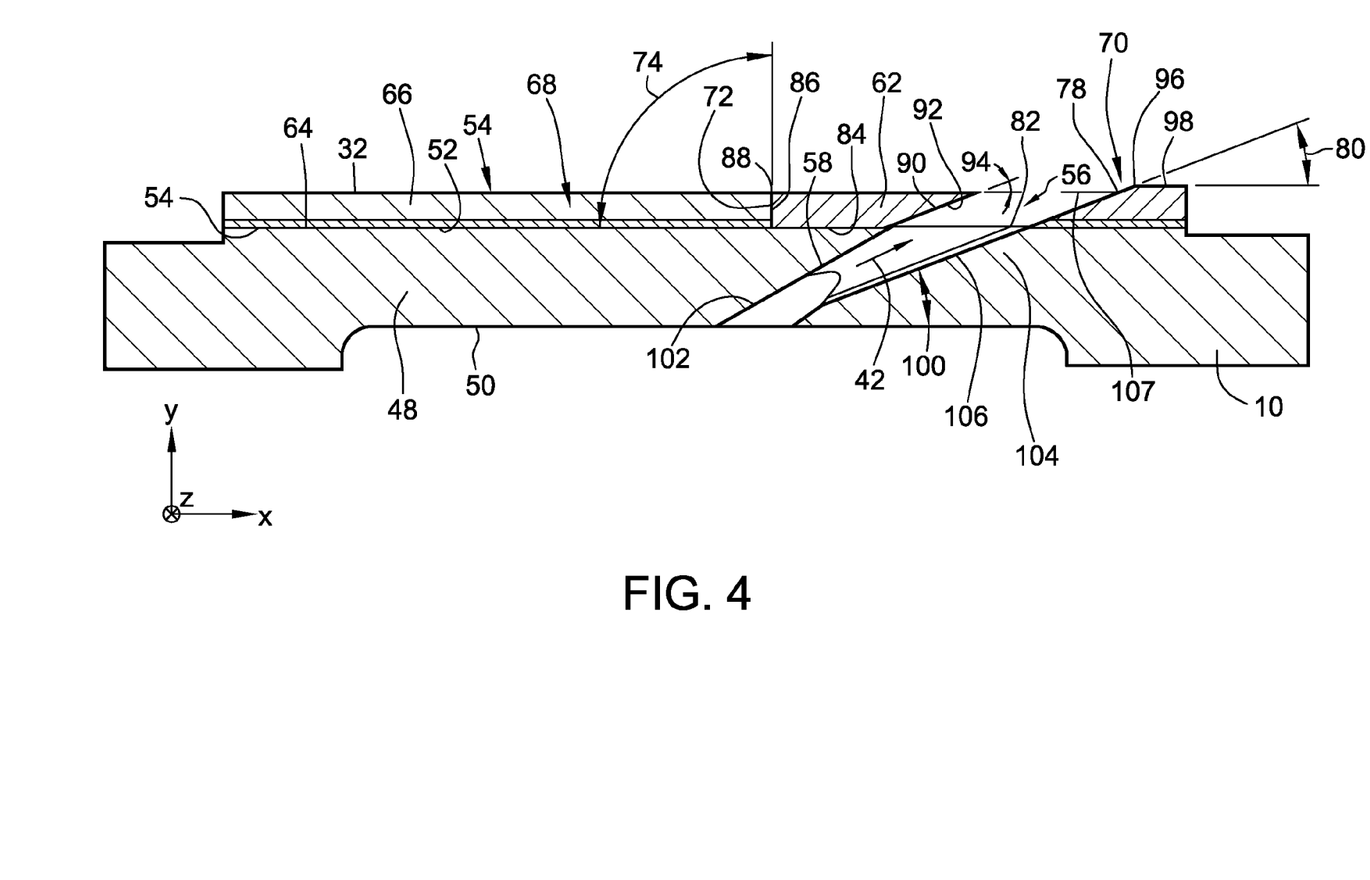
FIG. 4 is a cross-sectional view of the cover and the turbine component shown in FIG. 3 taken along line 4-4.

FIG. 3 is a perspective view of an exemplary cover 62 coupled to turbine component 10. FIG. 4 is a cross-sectional view of cover 62 and turbine component 10 taken along line 4-4 of FIG. 3. In the exemplary embodiment, TBC 54 includes a bond layer 64 coupled to outer surface 52 of substrate 48 and a thermal barrier layer 66 disposed along and coupled to bond layer 64. In the exemplary embodiment, bond layer 64 includes an oxidation resistant metallic material designed to inhibit oxidation and/or corrosion of underlying substrate 48. Bond layer 64 may include a material made of "MCrAlY," where "M" represents iron, nickel or cobalt, or from an aluminide or metal aluminide material (e.g., platinum aluminide). Thermal barrier layer 66 includes a temperature resistant material which is configured to facilitate increasing operating temperature capability of substrate 48. In the exemplary embodiment, thermal barrier layer 66 is formed from various materials, such as, for example, zirconia partially or fully stabilized by yttrium oxide, magnesium oxide or metal oxides. Alternatively, bond layer 64 and thermal barrier layer 66 may include any material composition to enable TBC 54 to function as described herein. Moreover, TBC 54 need not include multiple layers. For example, TBC system 56 may include a thermal barrier layer applied directly to outer surface 52 of substrate 48.

In the exemplary embodiment, TBC 54 includes a first portion 68 and a second portion 70 disposed downstream of first portion 68. As used herein, term "downstream" refers to direction in which local flow of medium 42 is traveling as represented by arrows. First portion 68 includes a substantially straight end 72 that extends outwardly from outer surface 52 such that a first angle 74 is defined between first portion 68 and outer surface 52. Moreover, second portion 70 includes an angled end 78 that extends outwardly from outer surface 52 such that a second angle 80 is defined between second portion 70 and outer surface 52. Angled trench 56 is formed in TBC 54 such that a bottom surface 82 of angled trench 56 extends parallel to and is defined by outer surface 52 of substrate 48. Alternatively, angled trench 56 may be defined through only a portion of TBC 54, such as by forming angled trench 56 within TBC 54 such that bottom surface 82 is defined entirely by and/or in one of layers 64 and 66 of TBC 54.

A fastener 84 couples cover 62 to outer surface 52 and to TBC 54. In the exemplary embodiment, fastener 84 includes a brazed fastener configured to couple cover 62 to outer surface 52 and/or TBC 54. Alternatively, fastener 84 can include, for example, an adhesive, a weld, and bonding agent. Fastener 84 can include any structure and/or composition to enable coupling cover 62 to outer surface 52. Cover 62 includes a first end 86 having a straight surface 88 and a second end 90 having an angled surface 92. In the exemplary embodiment, first end 86 is coupled to first portion 68 and second end 90 extends into trench 56. More particularly, angled surface 92 extends outwardly from outer surface 52 and into trench 56 such that a third angle 94 is defined between outer surface 52 and second end 90. In the exemplary embodiment, cover 62 includes a pre-sintered preform. Alternatively, cover 62 may include any structure and material composition such as alloys and powders to enable cover 62 to function as described herein.

Cover 62 is sized, shaped and coupled to outer surface 52 and/or TBC 54 to facilitate efficient and economic installation during manufacturing processes of turbine component 10 and/or during repair processes of turbine component 10. Moreover, cover 62 is sized, shaped and coupled to outer surface 52 and/or TBC 54 to facilitate flow of medium 42 from channel 58 and toward angled end 78 for subsequent flow along and/or adjacent to second portion 70.

In the exemplary embodiment, first angle 74 includes an angle of about 90 degrees. Moreover, second and third angles 80 and 94 include an angle equal to less than about 90 degrees, such as less than about 60 degrees or less than about 45 degrees or less than about 40 degrees. Second angle 80 may be smaller than third angle 94 such that transition at surface end 96 between second portion 70 and surface 98 of airfoil 14 is relatively smooth, thereby facilitating flow of medium 42 to layover onto airfoil surface 98. In the exemplary embodiment, third angle 94 may be equal to an angle ranging from about 15 degrees to about 45 degrees, such as from about 20 degrees to about 40 degrees or from about 20 degrees to about 30 degrees and the subranges there between, and second angle 80 may be equal to an angle ranging from about 5 degrees to about 35 degrees, such as from about 10 degrees to about 30 degrees or from about 10 degrees to about 20 degrees and the subranges there between. Alternatively, second and third angles 80 and 94 may be equal or may differ from one another. Second and third angles 80 and 94 are configured to facilitate flow of medium 42 along airfoil surface 98 as described herein. First angle 74, second angle 80 and third angle 94 may include any angle to enable turbine component 10 to function as described herein.

In the exemplary embodiment, each diffuser channel 58 is defined in airfoil 14 so as to extend between inner surface 50 of substrate 48 and bottom surface 82 of angled trench 56. Each diffuser channel 58 includes an angled orientation between inner surface 50 of substrate 48 and bottom surface 82. More particularly, diffuser channel 58 may be inclined at a fourth angle 100 of less than about 60 degrees, such as less than about 45 degrees or less than about 40 degrees. Moreover, angle 100 of diffuser channel 58 may be substantially equal to third angle 94 of angled surface 92. More particularly, channel 58 is aligned with angled end 78 of second portion 70 and angled surface 92 of cover 62. Alternatively, angle 100 may be equal to second angle 80 of second portion 70 or may differ from both second and third angles 80 and 94. Fourth angle 100 may include any angle to enable channel 58 to function as described herein. Alternatively, straight non-diffusing channels (not shown) of any suitable, relatively constant cross-section may be used.

Each diffuser channel 58 includes a metering portion 102 and a diffusing portion 104. In the exemplary embodiment, metering portion 102 of each diffuser channel 58 includes a substantially straight passage extending between inner surface 50 of substrate 48 and diffusing portion 104. Medium 42 that is supplied through and from airfoil circuit 40 (shown in FIG. 2) flows into metering portion 102 of each diffuser channel 58 at inner surface 50 and flows to diffusing portion 104 of each diffuser channel 58. Metering portion 102 includes a substantially constant cross-sectional area such as a constant circular cross-sectional shape between inner surface 50 and diffusing portion 104. Alternatively, metering portion 102 may have any or suitable cross-sectional shape, such as by defining a rectangular or oval cross-sectional shape.

Diffusing portion 104 of each diffuser channel 58 is configured to diverge outwardly from metering portion 102 towards bottom surface 82 of angled trench 56. Diffusing portion 104 includes a generally rectangular cross-sectional shape configured to diverge outwardly in a radial or longitudinal direction of angled trench 56 between metering portion 102 and bottom surface 82. In the exemplary embodiment, diffuser portion 104 substantially aligns with angled end 78 of TBC 54. Medium 42 directed through metering portion 102 and into diffusing portion 104 expands outwardly as it flows from diffuser channel 58, along angled surface 92 and into angled trench 56.

During an exemplary cooling of turbine component 10, supply passages 46 (shown in FIG. 1) discharge medium 42 from a source (not shown) through cooling circuit 40 (shown in FIG. 1) and into channel 58. Medium 42 supplied into channel 58 flows into metering portion 102 of each channel 58 and flows through such portion 102 to diffusing portion 104 of each channel 58. Medium 42 directed through metering portion 102 and into diffusing portion 104 expands outwardly as it flows from diffuser channels 58, into angled trench 56, and along cover angled end 78. More particularly, diverging sidewalls 106 permit medium 42 to expand in radial or longitudinal direction within diffusing portion 104, thereby reducing velocity and increasing pressure of medium.

Medium 42 continues to flow along angled surface 92 of cover second end 90. Angled surface 92 is configured to direct medium 42 into trench 56 and toward second portion 70 of TBC 54, and in particular toward angled end 78. In an exemplary embodiment, second portion 70 includes a shallower angle than angled surface 92 to facilitate flow attachment of medium 42 against surface of airfoil 14 as medium 42 is directed by angled surface 92. Medium 42 exits angled trench 56 at end 96 of second portion 70. The transition of medium 42 at end 96 between angled end 78 and airfoil surface 98 is relatively smooth, to facilitate flow of medium to layover onto airfoil surface 98. Moreover, the reduced velocity of medium flow 42 facilitates enhanced flow attachment of medium 42 against angled end 78 of second portion 70; and, thus, in turn, enhances flow attachment of medium 42 against surface 98 of airfoil 14 (shown in FIG. 1). Accordingly, medium 42 flowing through airfoil circuit 40 (shown in FIG. 1) is directed into angled surface 92 through each of diffuser channel 58 and is subsequently discharged from angled surface 92 and onto angled end 78 of second portion 70 for directed flow along pressure side surface 32 of airfoil 14 to facilitate film cooling component 10.

During an exemplary repair process for turbine component 10, damaged and/or corroded cover 62 is removed from outer surface 52 and/or TBC 54. A new cover 62 is coupled to outer surface 52 and/or TBC 54. A mask 107 is coupled to at least one of first portion 68, cover 62 and second portion 70. Mask 107 is applied across trench 56 to cover and/or block channel 58 and/or inner surface 50. Moreover, a new TBC 54 is applied to surface 52, wherein mask 107 prevents applied TBC 54 from entering channel 58 and/or inner surface 54. Mask 107 is then removed to expose trench 56 and channel 58. The repair process or rework process is performed to facilitate forming a smooth transition from TBC 54 to trench channel 58 and to new cover 62.

Figure 5:
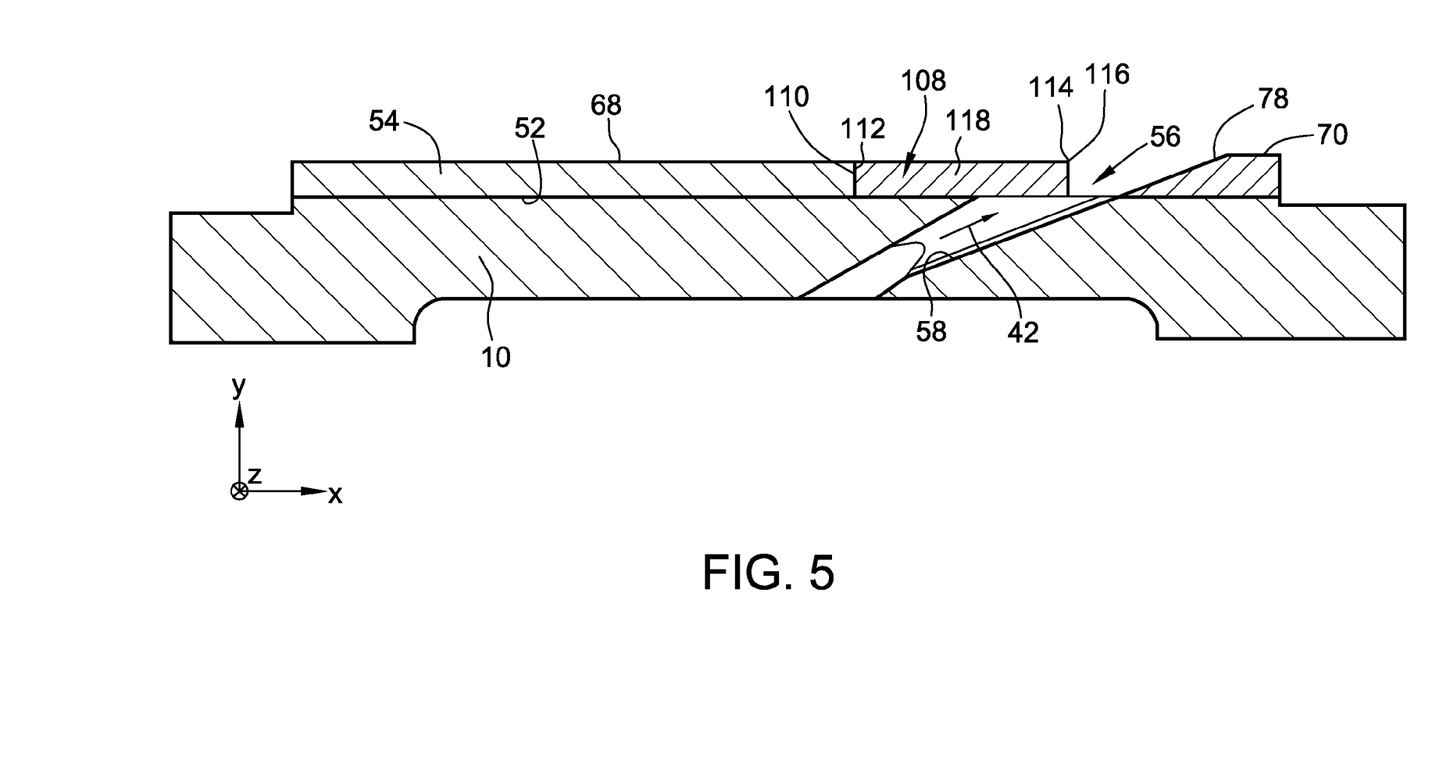
FIG. 5 is a cross-sectional view of another exemplary cover coupled to the turbine component shown in FIG. 1.

FIG. 5 is a cross-sectional view of another cover 108 coupled to turbine component 10. In the exemplary embodiment, cover 108 is coupled to outer surface 52 and/or to TBC 54. Cover 108 includes a first end 110 having a substantially first straight surface 112 and second end 114 having a substantially second straight surface 116. More particularly, first end 110 is coupled to first portion 68 and second end 114 extends into trench 56. Second straight surface 116 is configured to direct flow of medium 42 out of channel 58, through trench 56 and toward angled end 78 at second portion 70. Alternatively, surface 116 may include an angular configuration. Cover 108 further includes a body 118 between first and second ends 110 and 114. In the exemplary embodiment, body 118 includes a uniform thickness from first end 110 to second end 114. First and second straight surfaces 112 and 116 and body 118 are configured to facilitate convenient manufacturing, handling and application of cover 108 to turbine component 10. Extended cover 108 is configured to facilitate directing the flow of medium 42 at the desired lower angle of downstream surface 78. Moreover, extended cover 108 is configured to facilitate reducing the mixing of the flow of medium 42 with oncoming hot gases (not shown) to increase the film effectiveness of flow 42 to protect component 10 from the hot gases.

Figure 6:
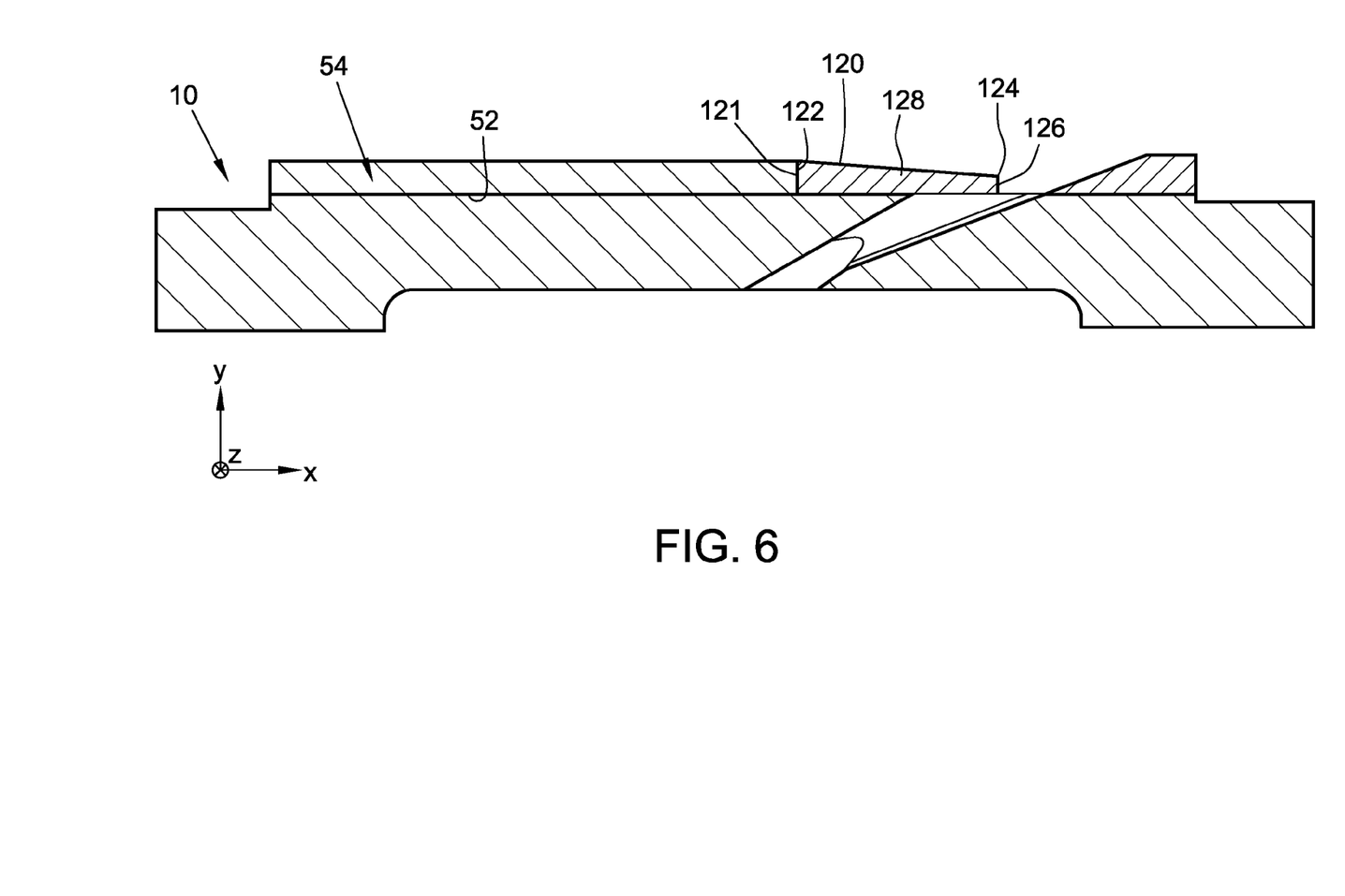
FIG. 6 is cross-sectional view of another exemplary cover coupled to the turbine component shown in FIG. 1.

FIG. 6 is a cross-sectional view of another exemplary cover 120 coupled to turbine component 10. In the exemplary embodiment, cover 120 is coupled to outer surface 52 and/or to TBC 54. Cover 120 includes a first end 121 having a substantially first straight surface 122 and a second end 124 having a substantially second straight surface 126. Cover 120 further includes a body 128 between first and second ends 121 and 124. In the exemplary embodiment, body 128 includes a non-uniform thickness from first end 121 to second end 124. In the exemplary embodiment, body 128 includes a tapered configuration from first end 121 to second end 124. Alternatively, body 128 can include any varying thickness configuration such as, for example, a curved configuration and scalloped configuration either along surface from first end 121 to second end 124 and/or at second end 124. Body 128 can include any configuration to enable cover 120 to function as described herein. First and second straight surfaces 122 and 126 and body 138 are configured to facilitate convenient manufacturing, handling and application of cover 120 to turbine component 10 and configured to facilitate eliminating and/or reducing flow discontinuities, hot spots, and channel coolant flow where desired.

Figure 7:
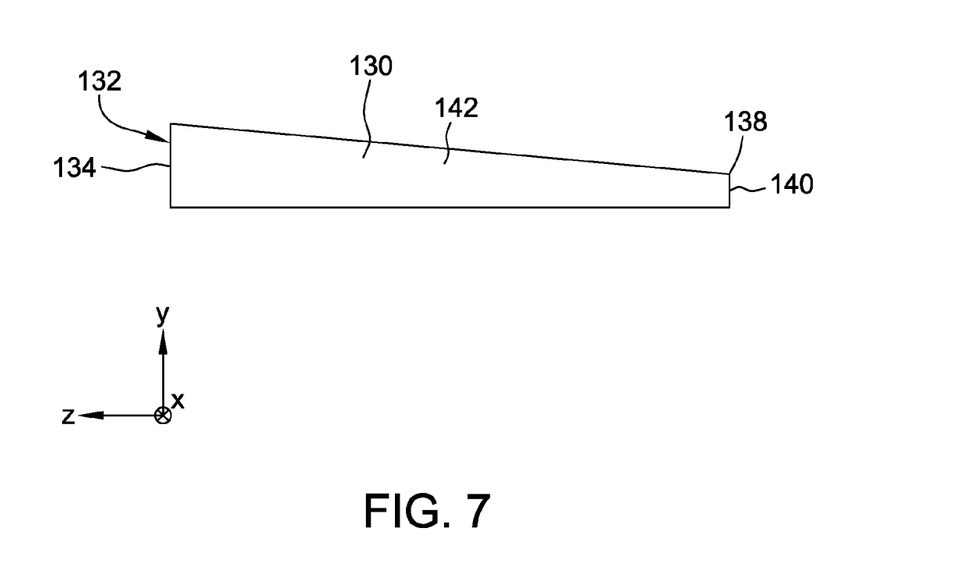
FIG. 7 is a front elevational view of another exemplary cover.

FIG. 7 is a front elevational view of another exemplary cover 130. Cover 130 includes a first end 132 having a substantially first straight surface 134 and a second end 138 having a substantially second straight surface 140. Cover 130 further includes a body 142 between first and second ends 132 and 138. In the exemplary embodiment, body 142 includes a non-uniform thickness from first end 132 to second end 138. In the exemplary embodiment, body 142 includes a tapered configuration from first end 132 to second end 138. Alternatively, body 142 can include any varying thickness configuration such as, for example, a curved configuration and scalloped configuration either along first end 132 to second end 138 and/or along second end 138. First and second surfaces 134 and 140 and body 142 are configured to facilitate convenient manufacturing, handling and application of cover 130 to turbine component 10 (shown in FIG. 1) and configured to facilitate eliminating and/or reducing flow discontinuities, hot spots, and channel coolant flow where desired.

Figure 8:
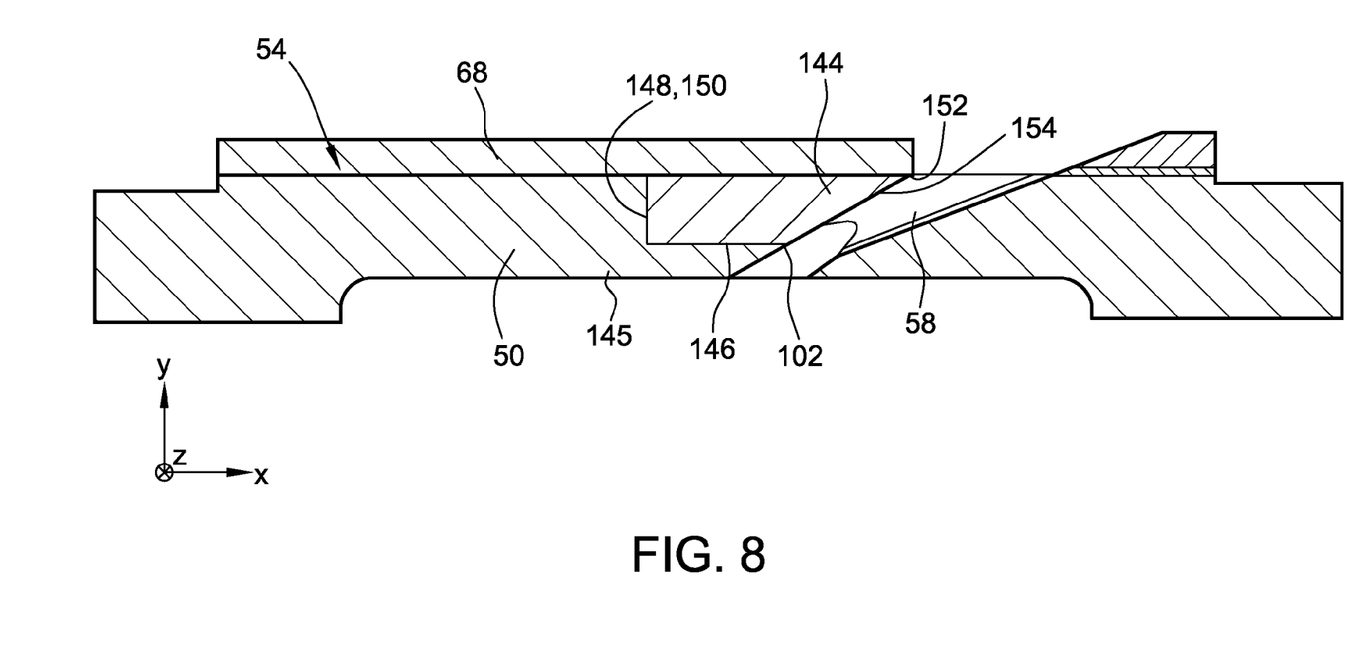
FIG. 8 is a cross-sectional view of another exemplary cover coupled to a turbine component.

FIG. 8 is a cross-sectional view of another exemplary cover 144 coupled to another exemplary turbine component 145. In the exemplary embodiment, substrate 50 includes a recess 146. Cover 144 includes a first end 148 having a substantially straight surface 150 and a second end 152 having an angled surface 154. First end 148 is coupled to recess 146 and second end 152 aligns with metering portion 102 of channel 58. Moreover, first portion 68 of TBC 56 extends along cover 144 from first end 148 to second end 152. Cover 144 and recess 146 are configured to facilitate manufacturing, handling and application of cover 144 to turbine component 10 (shown in FIG. 1). Moreover, recessed cover 144 is configured to facilitate TBC 56 to uniformly cover up to and beyond channel 58 as desired.

Figure 9:
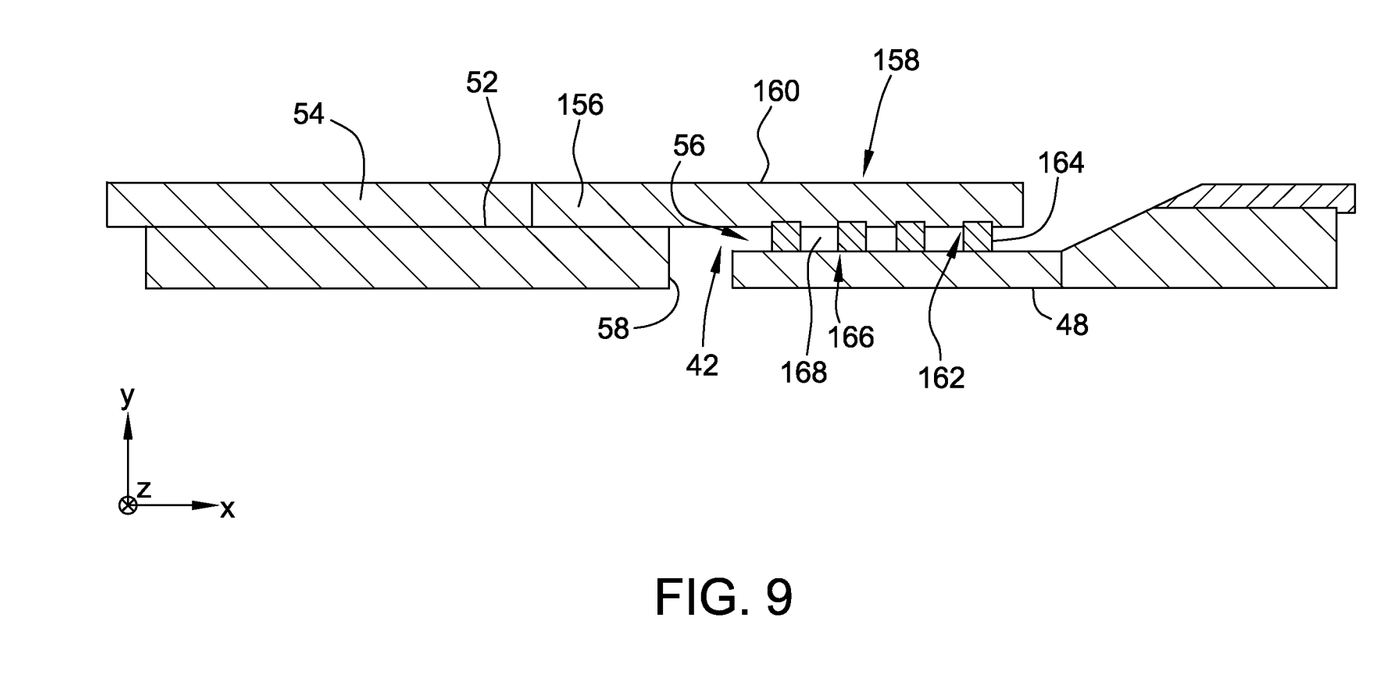
FIG. 9 is a cross-sectional view of another exemplary cover coupled to the turbine component shown in FIG. 1.

FIG. 9 is a cross-sectional view of another exemplary cover coupled to turbine component 10. Cover 156 is coupled to outer surface 52 and/or to TBC 54 and includes a non-diffuser shape 158 such as, but not limited to, slots, meshed slots, metered slots, apertures, pin banks and/or porous media. In the exemplary embodiment, cover 156 includes a first portion 160 and a second portion 162. First portion 160 is coupled to outer surface 52 and to TCB 54 and extends into trench 56. Second portion 162 is coupled to first portion 160 and to substrate 48. Second portion 162 includes a plurality of members 164 configured in an arrayed layout 166 having a space 168 between adjacent members 164.

Each member 164 includes a first end 170 coupled to first portion 160 and a second end 172 coupled to substrate. A body is coupled to first end 170 and second end 172 and extending therebetween. In the exemplary embodiment, each member 164 includes a column shape having a circular cross section. Alternatively, members 164 can include other cross sectional shapes such as, for example, square and rectangular. Members 164 can include any shape to enable cover to function as described herein. First portion 160 and second portion 162 are configured to facilitate directing flow of medium 42 from channel 58, through spaces 168 and into trench 56. Moreover, first portion 160 and second portion 162 are configured to facilitate heat transfer from first portion 160, through second portion 162 and into medium 42.

Figure 10:
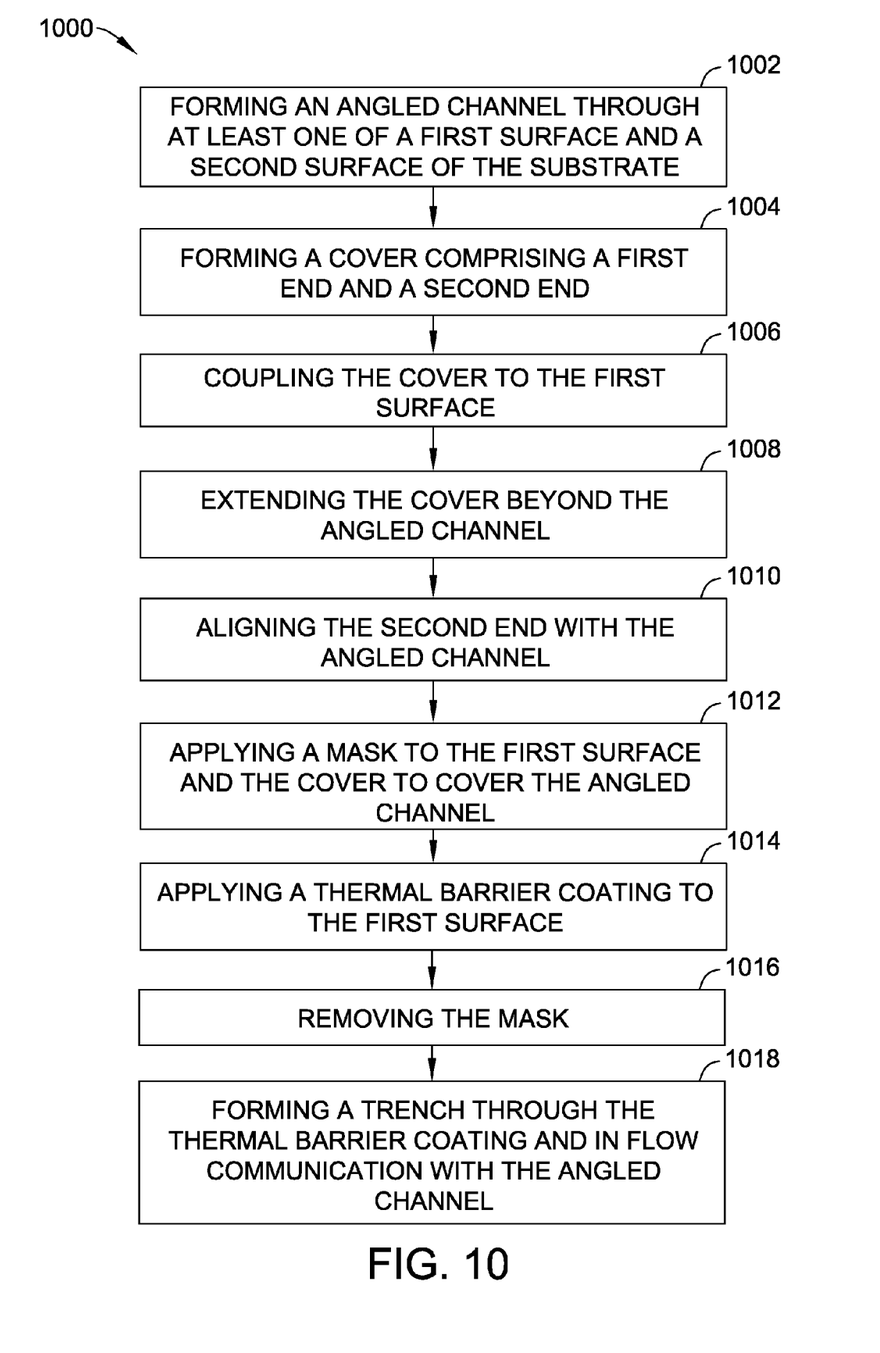
FIG. 10 is an exemplary flowchart illustrating a method of manufacturing a turbine component.

FIG. 10 is an exemplary flowchart illustrating a method 1000 of manufacturing a turbine component, for example turbine component 10 (shown in FIG. 4). Method 1000 includes forming 1002 an angled channel, such as channel 58 (shown in FIG. 4), through at least one of a first surface and a second surface, for example first surface 50 (shown in FIG. 4) and second surface 52 (shown in FIG. 4) of a substrate, such as substrate 48 (shown in FIG. 4). In the exemplary method, channel may be formed by machining processes, such as by using a laser machining process, an EDM process, a water jet machining process, a milling process and/or any or suitable machining process. Additionally, in one embodiment, a metering portion, for example metering portion 102 (shown in FIG. 4), of each diffuser channel may be formed in a separate manufacturing step from a diffusing portion, for example diffusing portion 104 (shown in FIG. 4), of each diffuser hole 14. For example, metering portion may be initially formed within substrate with diffusing portion being subsequently machined therein or vice versa. Alternatively, metering portion and diffusing portion may be formed together in a single manufacturing step.

In the exemplary method 1000, a cover, for example cover 62 (shown in FIG. 4), is formed 1004, wherein the cover includes a first end and a second end, such as first and second ends 86 and 90 (shown in FIG. 4). Method 1000 includes coupling 1006 the first end of the cover to the first surface. Moreover, the cover is extended 1008 beyond the angled channel. In the exemplary method 1000, forming the cover includes forming a straight surface, for example straight surface 88 (shown in FIG. 4), into the first end and a forming an angled surface, for example angled surface 92 (shown in FIG. 4), into the second end. Method further includes aligning 1010 the second end with the angled channel. During the formation process and/or a repair process, method includes applying 1012 a mask, for example mask 107 (shown in FIG. 4), to the first surface. The mask is configured to cover and/or block the angled channel.

Method 1000 further includes applying 1014 a TBC, such as TBC 54 (shown in FIG. 4), to the first surface of the substrate. In the exemplary method 1000, TBC includes a bond layer, for example bond layer 64 (shown in FIG. 4), and a thermal barrier layer, for example thermal barrier layer 66 (shown in FIG. 4). Bond layer and thermal barrier layer are applied onto the first surface of substrate using any suitable process including, but not limited to, pack diffusion processes, physical vapor deposition processes, chemical vapor deposition processes and/or thermal spraying processes. Method 1000 includes removing mask 1016. In one embodiment, the mask is removed to expose the cover and the angled channel.

Method 1000 further includes forming 1018 a trench, for example trench 56 (shown in FIG. 4), through TBC and in flow communication with the angled channel. In the exemplary method, the trench is formed by removing portions of the TBC. The trench may be formed using any suitable process such as a laser machining process to form the trench within the TBC. Alternatively, the trench may be formed within the TBC using an electrical discharge machining ("EDM") process, a water jet machining process (e.g., by using an abrasive water jet process) and/or a milling process. Alternatively, any or suitable machining process for removing selected portions of material from an object may be utilized to form angled trench. In the exemplary method, the mask is applied to substantially cover the first surface. Alternatively, the mask may partially cover the first surface and the TBC may cover the exposed and/or unmasked first surface.

Method 1000 includes forming a first portion, for example first portion 68 (shown in FIG. 4), of the TBC and forming a second portion, for example second portion 70 (shown in FIG. 4), which is spaced from the first portion. Moreover, method 1000 includes forming an angled end, for example angled end 78 (shown in FIG. 4), into the second portion.

A technical effect of the systems and methods described herein includes at least one of: directing cooling medium along an airfoil having a first surface and a second surface; a thermal barrier coating coupled to the second surface and having a first portion, a second portion and a trench defined between the first and second portions; a channel coupled in flow communication to the first surface and the trench, wherein the channel includes a first sidewall and a second sidewall opposite of the first sidewall, such that the first and second sidewalls extend from the first surface and toward the trench at an angle; and a cover coupled to the second surface and having a first end coupled to the first portion and a second end extending into the trench and spaced from the second portion.

The exemplary embodiments described herein facilitate directing cooling medium along a heated surface such as a pressure side and/or suction side of a turbine airfoil. The embodiments described herein use a cover such as a pre-sintered preform to direct flow of medium along the airfoil surface to enhance heat transfer effectiveness. Moreover, the embodiments described herein facilitate increasing turbine efficiency and/or output and/or temperature capabilities while reducing operational and maintenance costs associated with the turbine. Still further, the embodiments described herein enhance component life and refurbishment of parts. The cover improves medium flow and provides multi-interval capability by allowing the diffuser hole/channel to be at the bottom of the trench.

Exemplary embodiments of a turbine component and methods for assembling the turbine component are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other thermal applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A turbine component comprising:
   an airfoil comprising a first surface and a second surface;
   a thermal barrier coating coupled to said second surface and comprising a first portion, a second portion and a trench defined between said first and second portions;
   a channel coupled in flow communication to said first surface and said trench, said channel comprising a first sidewall and a second sidewall opposite of said first sidewall, said first and second sidewalls extending from said first surface and toward said trench at an angle; and
   a cover coupled to said second surface and comprising a first end coupled to said first portion and a second end extending into said trench and spaced from said second portion.
2. The turbine component of claim 1, wherein said first portion comprises a straight end and said second portion comprises an angled end.

3. The turbine component of claim 1, wherein said first portion comprises a straight end and said second portion comprises an angled end that is substantially aligned with said second sidewall.

4. The turbine component of claim 3, wherein said angle of said angled end and second sidewall is less than about 90 degrees.

5. The turbine component of claim 1, wherein said first end comprises a straight surface and said second end comprises an angled surface.

6. The turbine component of claim 1, wherein said second end comprises an angled surface that is substantially aligned with said first sidewall.

7. The turbine component of claim 1, wherein said cover comprises a substantially uniform thickness from said first end to said second end.

8. The turbine component of claim 1, wherein said cover comprises a non-uniform thickness from said first end to said second end.

9. The turbine component of claim 1, wherein said second end is substantially straight.

10. The turbine component of claim 1, wherein said cover comprises a pre-sintered preform.

11. The turbine component of claim 1, further comprising a brazed fastener coupled to said second surface and to said cover.

12. A cover coupled to an airfoil and positioned within a trench to direct medium flow from an angled channel and along the airfoil, said cover comprising:
a first end coupled to the airfoil;
a second end coupled to said first end and configured to extend into the trench, said second end comprising an angled surface that is aligned with the angled channel; and
a brazed fastener coupled to said first and second ends and to said airfoil, wherein said cover comprises a plurality of column members.

13. The cover of claim 12, wherein said first and second ends comprise a pre-sintered pre-form.

14. A method of manufacturing a turbine component, said method comprising:
forming an angled channel through at least one of a first surface and a second surface of a substrate;
forming a cover comprising a first end and a second end;
coupling the cover to the first surface;
extending the cover beyond the angled channel and aligning the second end with the angled channel;
applying a mask to the first surface and the cover to cover the angled channel;
applying a thermal barrier coating to the first surface; and
forming a trench through the thermal barrier coating and in flow communication with the angled channel.

15. The method of claim 14, wherein forming the trench comprises forming a first portion of the thermal barrier coating and a second portion of the thermal barrier coating and spaced from the first portion.

16. The method of claim 15, further comprising forming an angled surface into the second portion.

17. The method of claim 14, wherein forming the cover comprises forming a straight surface into the first end and an angled surface into the second end.

18. The method of claim 14, wherein coupling the cover to the first surface comprises brazing the cover to the first surface.

19. The method of claim 14, further comprising removing the mask to expose the angled channel.

* * * * *